Aug. 4, 1964 A. A. ZUHN 3,143,103
MULTI-STAGE SUPERCHARGER WITH SEPARATE OUTLET FOR COOLING AIR
Filed Aug. 23, 1963
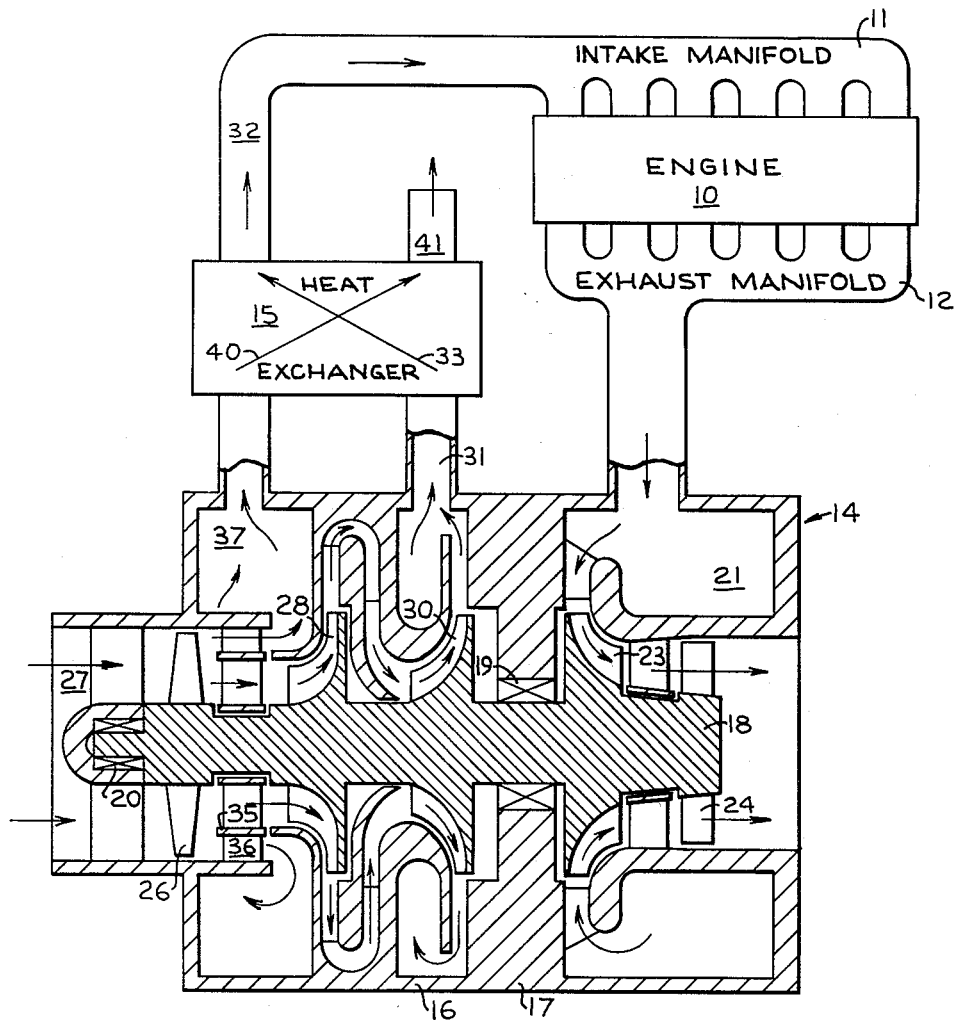
INVENTOR.
ARTHUR A. ZUHN
BY
*Fryer and Griswold*
ATTORNEYS United States Patent Office 3,143,103
Patented Aug. 4, 1964

3,143,103
MULTI-STAGE SUPERCHARGER WITH SEPARATE
OUTLET FOR COOLING AIR
Arthur A. Zuhn, East Peoria, Ill., assignor to Caterpillar
Tractor Co., Peoria, Ill., a corporation of California
Filed Aug. 23, 1963, Ser. No. 304,011
3 Claims. (Cl. 123—119)

This invention relates to superchargers or turbochargers such as used, for example, in increasing air supply to a combustion engine and particularly to improvements which enable part of the output of air under slightly elevated pressure and comparatively low temperature to be employed for cooling the remainder of the output of a turbocharger at higher pressure and higher temperature.

It is well known that compression of air creates heat and a tendency to expand which effects a reduction in oxygen content per unit of volume. Consequently, when highly compressed air is introduced to an engine, it must be cooled to obtain efficient combustion to the point where maximum oxygen per unit of volume is available to support combustion. Furthermore, the use of hot air at the intake of an engine tends to increase the operating temperature of the engine to a point beyond its optimum range. Introducing a coolant by power derived directly from an engine is not efficient since it utilizes horsepower otherwise available as engine output.

It is an object of the present invention to employ energy taken from the exhaust of an engine to effect cooling of supercharged air directed to the intake manifold. Further and more specifically, it is an object to provide a multistage supercharger or turbocharger wherein air from a first stage of compression is employed in heat exchange relationship with air from subsequent stages to effect cooling thereof before it enters the combustion areas of an engine. Further and more specific objects and advantages of the invention and the manner in which it is carried into practice are made apparent in the following specification by reference to the accompanying drawing.

The drawing is a schematic view partially in cross section of an engine, a multi-stage turbocharger and a heat exchanger embodying the present invention.

The drawing shows an engine 10 with intake and exhaust manifolds 11 and 12 respectively. A turbocharger generally indicated at 14 is driven by exhaust pressure from the manifold 12 to compress air to be directed to the intake manifold 11 after passing through a heat exchanger 15, the function of which is to reduce the temperature of the air to be consumed by the engine. The turbocharger may assume various specific forms but is herein illustrated as contained in a housing 16 divided by wall 17 to provide a turbine section to the right of the wall as shown in the drawing and a compressor section to the left. The turbine and compressor blades are mounted on a common shaft 18 supported as in bearings 19 and 20. Gas flowing from the exhaust manifold enters a manifold 21 in the turbine section to impart rotation to the shaft 18 passing radially inwardly through a set of radial turbine blades 23 and then through a set of axial turbine blades 24.

The compressor section of the turbocharger herein illustrated is of the multi-stage type including a first axial compression stage 26 which upon rotation draws atmospheric air inwardly through an inlet opening 27. A second radial stage 28 further compresses the air from the first stage 26 and directs it though suitable passages, as illustrated, to a third radial stage 30. Highly compressed air from the third radial stage is directed outwardly through a conduit 31, the heat exchanger 15, and a conduit 32 leading to the intake manifold of the engine, the direction of flow through the heat exchanger being illustrated graphically by an arrow 33. Tests indicate that as a result of passing through the compressor stage of the turbocharger, the pressure of air may be raised to a point in the order of 60 p.s.i. and the temperature to 500° F. so that upon expansion occurring upon introduction of the air into an engine, the oxygen content per unit volume thereof will be so low as to produce little beneficial effect in supporting combustion. In accordance with the present invention, the high temperature of this air is reduced in the heat exchanger 15 where it is brought into heat exchange relationship with a coolant in the form of compressed air at lower pressure and at approximately only 25° F. above ambient air temperature produced by the first stage compressor 26. To accomplish this, some of the air on the output side of the first stage compressor is separated by an annulus 35 supported by a spider or vane-like members 36 channeling a major portion of the output of compressor stage 26 into a chamber 37 while the balance passes radially through the annulus to the second and third stage compressors 28 and 30 respectively which compress it and direct it through the heat exchanger and to the engine.

The heat exchanger may assume any one of various conventional forms with tubes or fin-like structures of material having high heat conductivity arranged to maintain the coolant or low pressure air separate from the fluid to be cooled which in the present case is air under high pressure and high temperature. With the system described it has been found possible to reduce the temperature of the supercharged air from 500° F. to approximately 150° F. while the coolant or low pressure air passes through the heat exchanger, as in the direction of the arrow 40, to be exhausted through an outlet 41 at a temperature some 250° F. higher than that at which it entered the heat exchanger. Thus, a highly efficient job of cooling has been effected with power supplied by engine exhaust pressure rather than directly by the engine itself to effect a greatly minimized loss of engine horsepower. The invention described also has the advantage of simplicity as compared to known systems where cooling is accomplished with auxiliary fans or blowers driven directly by the engine.

What is claimed is:
1. In combination with an internal combustion engine having a supercharger for directing air under pressure to its combustion spaces, a heat exchanger for reducing the temperature of said air interposed between the supercharger and the engine, means to direct supercharged air through the heat exchanger, and means to direct supercharged air at lower pressure and temperature from adjacent the intake of the supercharger through the heat exchanger as a coolant.
2. The combination of claim 1 in which the supercharger is of the multi-stage type and the coolant is a portion of the output air of the first stage.
3. The combination of claim 2 in which an axially extending annulus wall is disposed concentrically of the output of the first stage and air flowing externally of the wall is directed to the heat exchanger.

References Cited in the file of this patent

UNITED STATES PATENTS
2,305,810    Mueller _____ Dec. 2, 1942
FOREIGN PATENTS
499,357    Great Britain _____ Jan. 23, 1939